United States Patent Office 3,140,626
Patented July 14, 1964

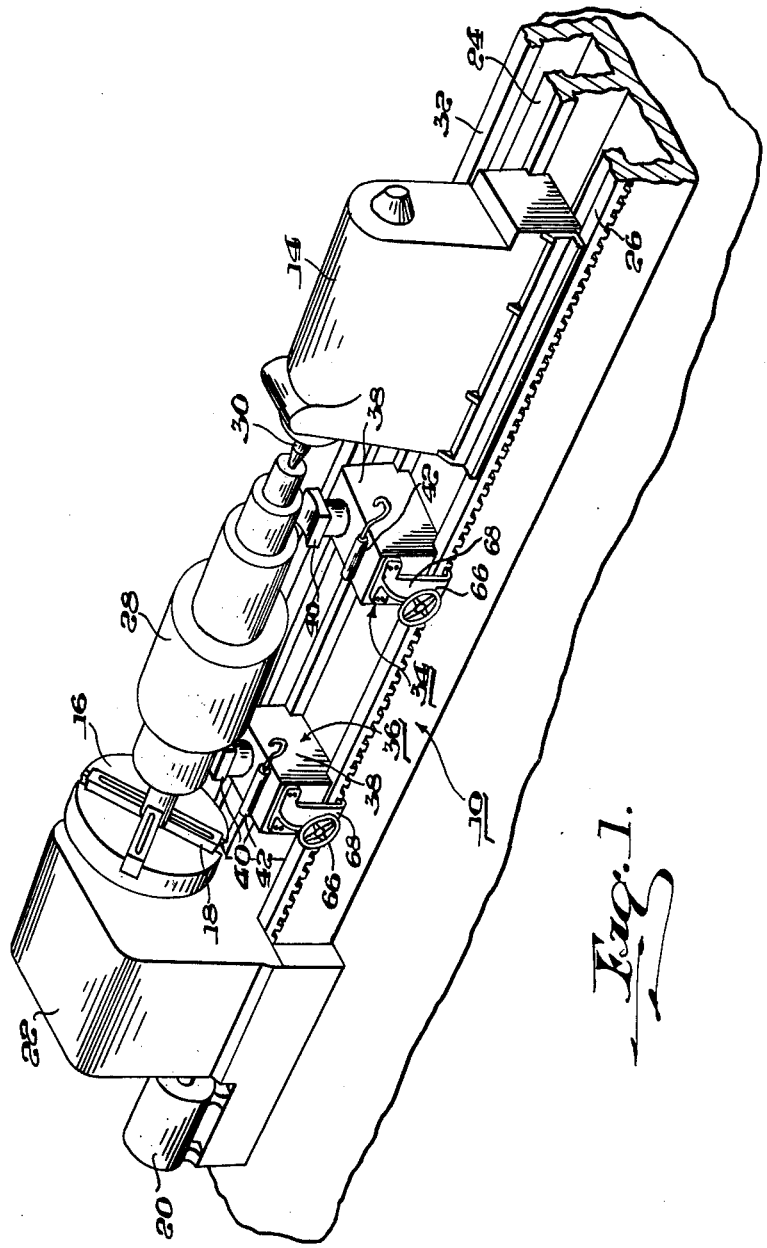

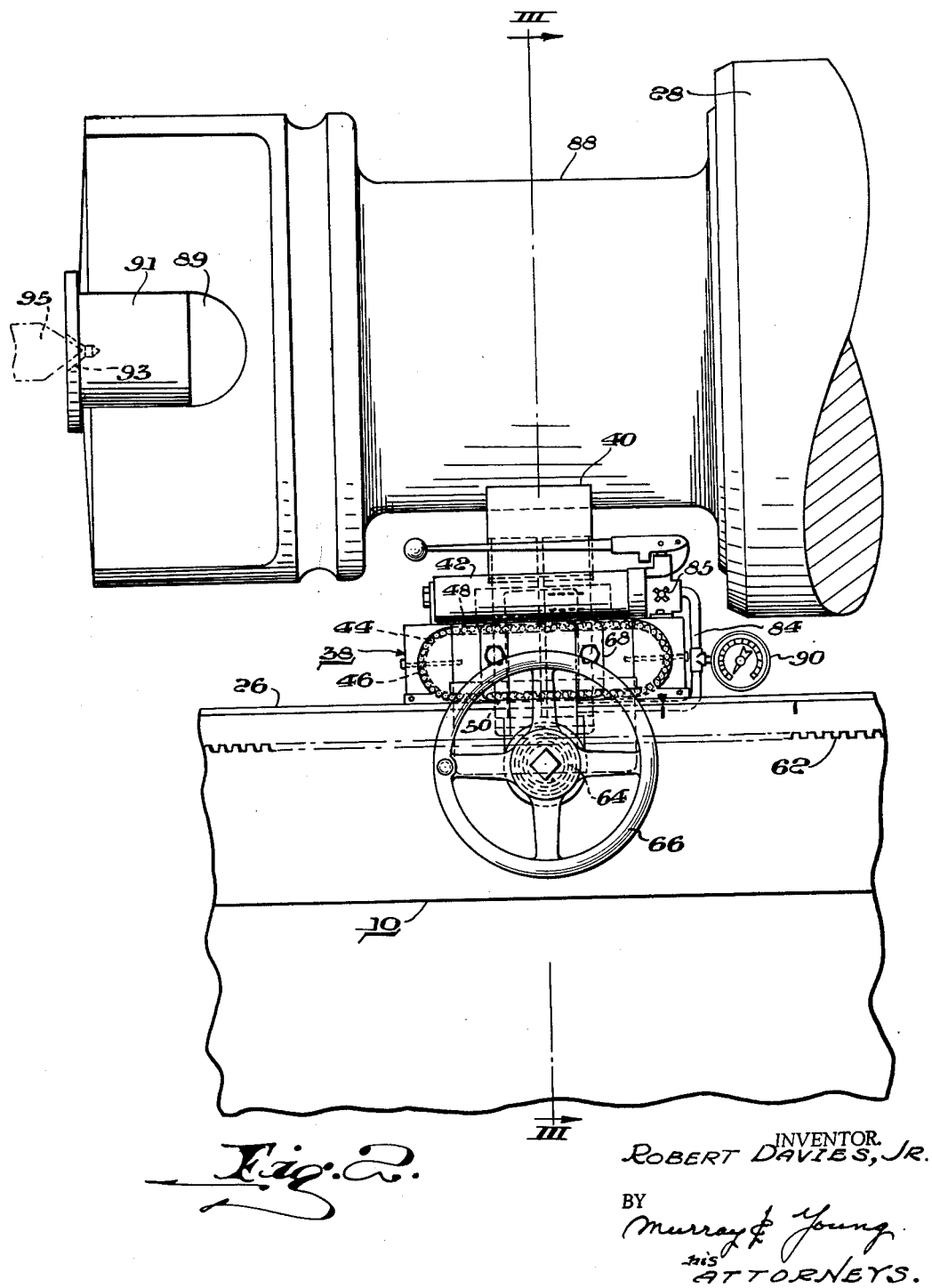

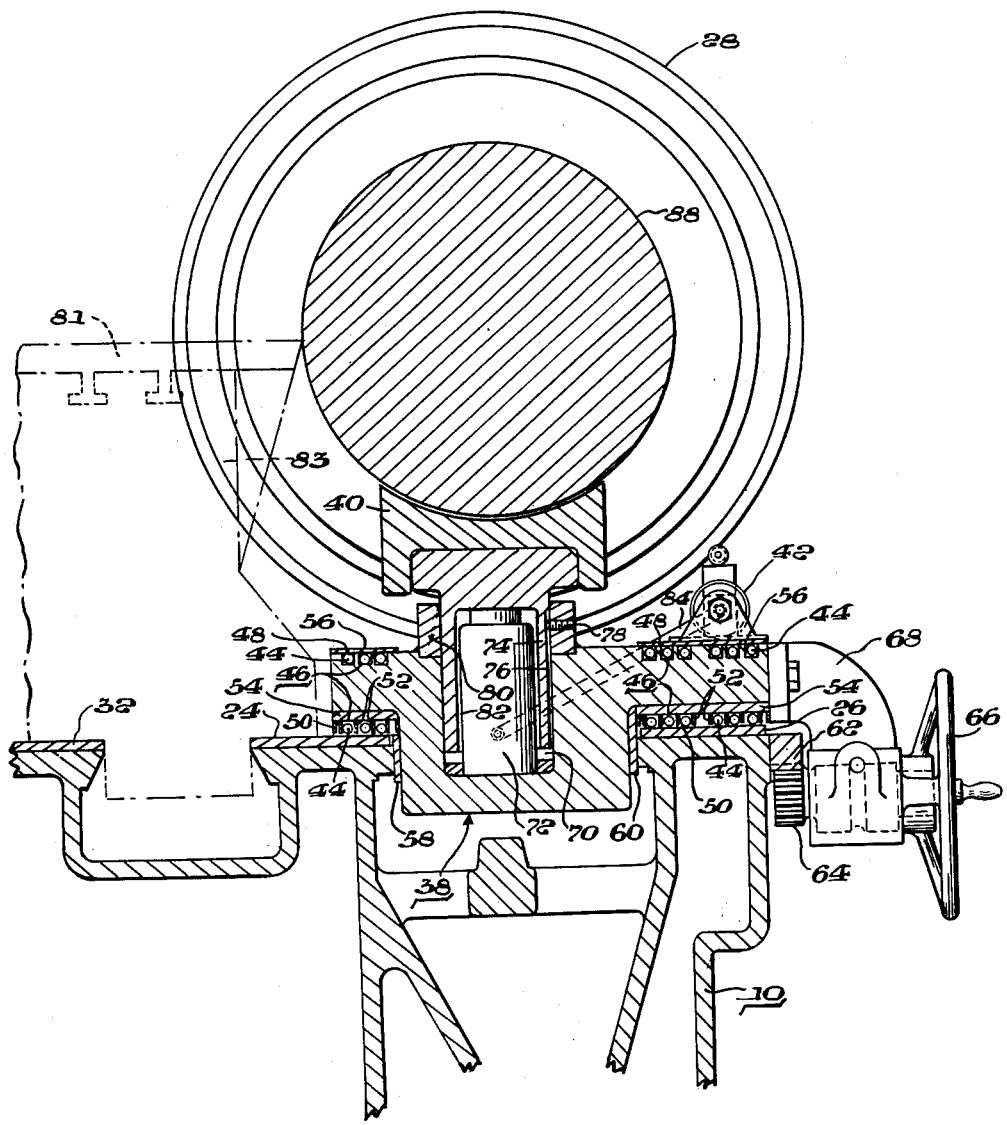

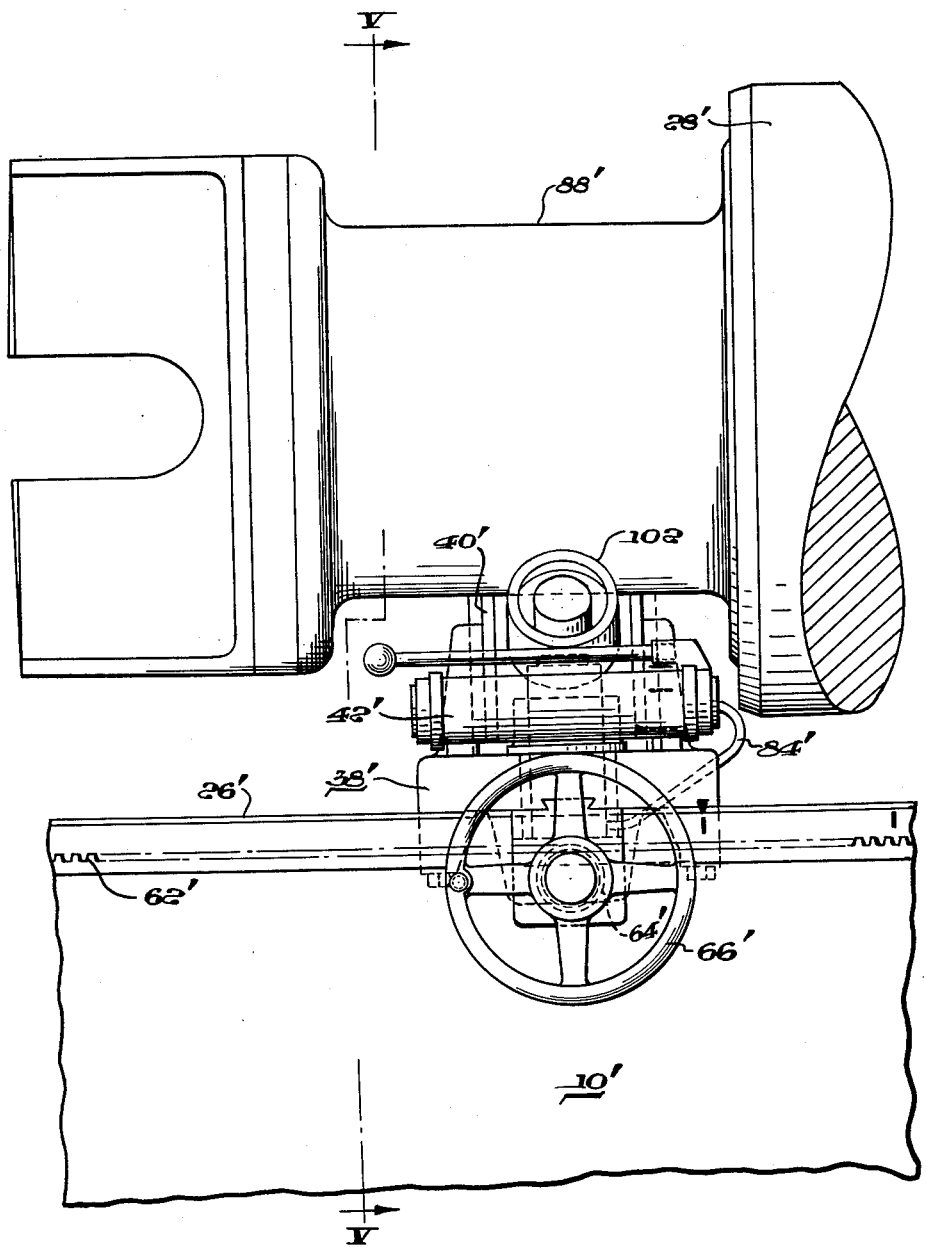

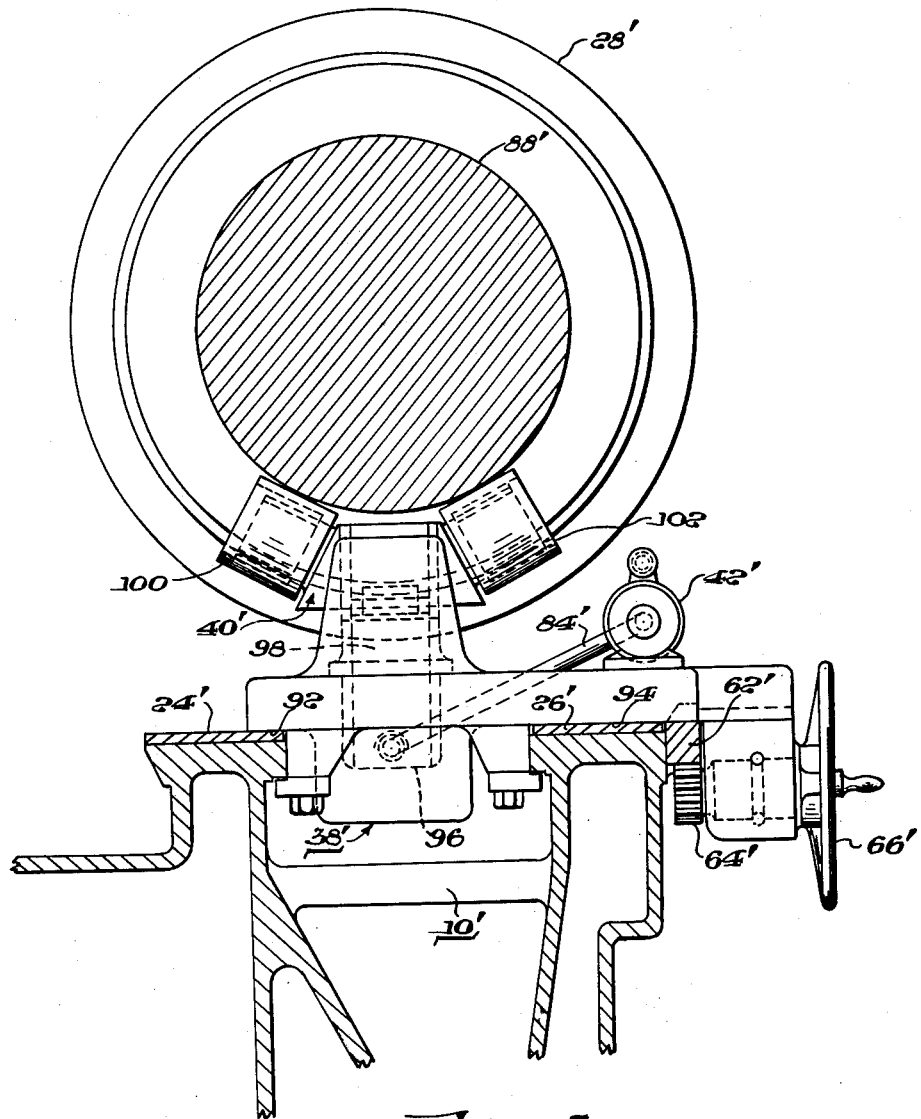

3,140,626
METHOD FOR LOADING WORKPIECES ONTO A LATHE
Robert Davies, Jr., Pittsburgh, Pa., assignor to Youngstown Foundry & Machine Company, Youngstown, Ohio, a corporation of Ohio
Filed June 4, 1962, Ser. No. 199,785
2 Claims. (Cl. 82—1)

This invention relates to a system for loading and unloading a lathe, and more particularly to a system of the type described particularly adapted for use with large, heavy workpieces.

As is known, workpieces are loaded onto a metalworking lathe by supporting one end of the workpiece on a center and/or a chuck rotatable on the headstock of the lathe, and by supporting the other end of the workpiece on a center carried on the lathe tailstock. Loading a lathe has been found to be particularly difficult in the case of large, heavy workpieces as, for example, the rolls used in a metalworking rolling mill, the obvious reason being that such rolls may weigh as much as forty tons or more. In the past, it has been the practice to load a heavy workpiece of this sort with the use of an overhead crane. That is, the roll or other workpiece was suspended from the crane hook by chains or cables, and the craneman signaled by a workman on the floor to raise or lower the workpiece and move it back or forth until its ends were centered with respect to the chuck and tailstock centers.

Needless to say, this method of aligning a workpiece of great weight with the lathe headstock and tailstock is extremely cumbersome and, to a certain extent, involves the danger of injury to the workmen who are attempting to move the workpiece into place. A great disadvantage of this method is the possibility of damage to the lathe itself which can occur, for example, by slamming of the extremely heavy suspended workpiece into the headstock, tailstock or other parts of the lathe. Furthermore, since the crane cannot drop the workpiece (i.e., remove its support) until the workpiece is centered between the points of the tailstock and headstock with the points inserted into countersinks in opposite ends of the workpiece, the possibility exists of the craneman, because of misjudgment, attempting to elevate the workpiece after the points are inserted, in which case extensive damage can be caused to the lathe. In addition, the operator by misjudgment, can cause undue stress on the crane supports and the lathe by improper alignment of centers with the workpiece. The same problems, possibly even more acute, are encountered when the workpiece is unloaded from the lathe.

As an overall object, the present invention provides a method for loading and unloading a lathe wherein the foregoing difficulties are eliminated.

More specifically, an object of the invention is to provide a method of the type described wherein the ends of the workpiece are initially deposited on adjustable cradle structures carried on the lathe bed between the headstock and tailstock, the arrangement being such that the workpiece may be raised or lowered and moved along the bed to align it with the headstock and tailstock and load it onto the lathe independently of an overhead crane or other workpiece supporting means.

In accordance with the invention, there are provided a pair of cradle structures between the headstock and tailstock of the lathe for supporting the opposite ends of a workpiece to be turned on the lathe, means for supporting the cradle structures for movement axially along the lathe bed whereby a workpiece on the cradle structures may be shifted back and forth between the headstock and tailstock, and means on the cradle structures for raising or lowering the opposite ends of the workpiece whereby they may be aligned with the centers of the lathe. In the loading operation, the workpiece is initially deposited on the cradle structures which are thereafter raised or lowered so as to align the workpiece with the tailstock and headstock centers, the cradles being moved along the lathe bed to correctly position the workpiece for loading.

The above and other objects and features of the invention will become apparent from the following detailed description taken in connection with the accompanying drawings which form a part of this specification, and in which:

FIGURE 1 is a perspective view of a conventional lathe employing the workpiece loading and unloading system of the invention;

FIG. 2 is a side elevational view of one embodiment of the invention for loading a workpiece onto a lathe;

FIG. 3 is a cross-sectional view taken along line III—III of FIG. 2;

FIG. 4 is an elevational side view of another embodiment of the invention; and

FIG. 5 is a cross-sectional view taken along line V—V of FIG. 4.

Referring now to the drawings, and particularly to FIG. 1, the lathe shown includes a bed 10 having a headstock 12 at its forward end and a tailstock 14 at its other end. The headstock 12 is fixed in position and carries a rotatable chuck 16 having a plurality of jaws 18 circumferentially spaced around its forward face. The chuck 16 is driven by means of an electric motor 20, the motor being connected through gearing within housing 22 to the chuck. The tailstock 14 is slideable axially along the bed 10 on spaced guideways or bedplates 24 and 26 and may be locked in position at any point therealong to faciitate workpieces of different lengths. The workpiece 28 itself is carried between a rotatable center 30 which projects outwardly from the tailstock 14 and a corresponding center on the chuck 16. In the case of lathes for extremely heavy workpieces, the center 30 is usually driven by motor means, not shown.

In accordance with usual practice, a tool holder, not shown in FIG. 1, is mounted for sliding movement on the bed 10 along guideway or bedplate 32. The tool holder, as its name implies, holds the cutting tool for the lathe in position and engages the surface of the workpiece 28 in order that it may be turned on the lathe.

The particular workpiece 28 shown in FIG. 1 is a roll for a metalworking rolling mill and may weigh as much as forty tons or more. As was mentioned above, it was the practice previous to this invention to load the workpiece 28 onto the lathe by suspending it from a crane, the workpiece being raised or lowered by the craneman and shifted back or forth until it was aligned with the center on chuck 16 and center 30. In order to secure the one end of the workpiece 28 to the chuck 16, the jaws 18, which are mounted on screws or the like, are initially moved radially outwardly to permit one end of the workpiece 28 to be inserted therebetween. Thereafter, the center 30 is moved inwardly into a countersink provided in the other end of the workpiece; and finally the jaws 18 are screwed radially inwardly to secure the end of the workpiece to the chuck.

As was mentioned above, the method of loading a workpiece onto the lathe by means of an overhead crane is unsatisfactory due to the fact that the workpiece, being suspended by chains or cables, may swing backwardly or forwardly during the loading operation and cause damage to the lathe. This is particularly true of the tailstock 14 where damage often occurs by virtue of the craneman attempting to hoist the workpiece after the center has been inserted into the countersink in its end.

In accordance with the present invention, the workpiece 28 is loaded onto the lathe by means of a pair of cradle structures, generally indicated at 34 and 36. As shown, each cradle structure includes a carriage 38 slideable along the guideways or bedplates 24 and 26, together with a cradle 40 which may be elevated or lowered by means of a hydraulic pump 42. In loading a lathe with the use of the cradle structures 34 and 36, the workpiece 28 is initially deposited on the upper surfaces of the cradles 40, and these cradles adjusted upwardly or downwardly until the ends of the workpiece are centered slightly below the center of chuck 16 and center 30, whereupon the workpiece may be moved into engagement with the center on chuck 16, the center 30 on tailstock 14 moved into engagement with the countersink at the other end of the workpiece, and the jaws 18 moved into position to clamp the one end of the workpiece 28. Since the centerline of the workpiece is slightly below the centers at the opposite ends of the lathe, it will be lifted off of the cradles 40 as it is pushed onto the centers. That is, the countersinks and centers are conical in shape, meaning that an inclined plane action takes place as the workpiece is loaded onto the centers to lift it from the cradles. Thereafter, the cradles 40 are lowered to permit free rotational movement of the workpiece 28 during a turning operation.

One embodiment of the cradle structures is shown in FIGS. 2 and 3, and it will be noted that the carriage 38 is supported on the bedplates 24 and 26 by anti-friction means which comprise ball bearings 44 in the particular embodiment of the invention shown in FIGS. 2 and 3. The ball bearings 44 are disposed within a plurality of continuous races 46 arranged in side-by-side relationship, each race having an upper reach 48 which is machined into the carriage 38 and a lower reach 50 formed between parallel plates 52. Above the ball bearings in the lower reaches are bronze plates 54 which provide an upper bearing surface for the ball bearings, the lower bearing surface therefor being provided by the bedplates 24 and 26. Covering the upper reaches 48 are plates 56, and above the plates 56 at the forward end of carriage 38 is the hand-operated hydraulic pump 42. The carriage 38 is thus guided for longitudinal movement on the ball bearings 44 and is guided laterally by means of bronze wear strips 58 and 60 (FIG. 3).

Extending along the front surface of the bed 10 and secured thereto is a gear rack 62 which engages a pinion gear 64 connected to a handwheel 66, this handwheel being supported on the carriage 38 by means of a bracket 68. Thus, when the handwheel 66 is rotated in one direction, the carriage 38 will be caused to traverse the bedplates 24 and 26 on ball bearings 44 in one direction; whereas rotation of the handwheel 66 in the opposite direction will cause the carriage 38 to traverse the bedplates 24 and 26 in the opposite direction. If desired or necessary, the handwheels 66 may be replaced by motors which, of course, would serve the same purpose.

Provided in the carriage 38 is a hydraulic cylinder 70 (FIG. 3) provided with a central cylindrical guiding member 72. Reciprocable within the cylinder 70 and surrounding the guiding member 72 is a generally tubular piston 74 having a longitudinally-extending keyway 76 milled into its outer surface to receive a guide key 78, this key being threadedly received within an annular collar 80 which surrounds the upper portion of piston 74. As will be understood, the purpose of the guide key 78 and keyway 76 is to prevent the piston 74 from rotating within the cylinder 70.

Between the inner periphery of the cylinder 70 and the periphery of the guiding member 72 is an annular passageway 82 which communicates, through conduit 84, with the hydraulic hand-pump 42. It will be appreciated that a variable volume chamber is formed between the underside of the piston 74, the lower surface of the cylinder 70, and the upper surface of the guiding member 72. Furthermore, since the conduit 84 communicates with this variable volume chamber, the admission of fluid under pressure from the pump 42 will cause the piston 74 to move upwardly. Similarly, when the pressure is released, the piston 74, under its own weight, will move downwardly, thereby forcing the fluid out of the variable volume chamber and through conduit 84 back into the pump 42.

Carried on top of the piston 74 is the cradle 40 having an upper surface shaped to conform to the radius of a surface of the workpiece 28. In the embodiment of the invention shown herein, it is assumed that the cradle 40 engages the undersurface of the neck portion 88 of a rolling mill roll which is carried within the bearings of the rolling mill. Actually, however, the cradle 40 could engage the underside of any portion of the workpiece. Connected to the conduit 84 is a pressure gage 90 (FIG. 2) which serves a purpose which will hereinafter be described.

As will be understood, there is an assembly such as that shown in FIGS. 2 and 3 at each end of the workpiece to be turned. In the operation of the invention, the ends of the workpiece to be turned may be initially deposited on the cradles 40, and the pistons 74 either raised or lowered by the hand-pumps 42 until the ends of the workpiece are slightly below the axis of the center on the chuck 16 and center 30. Alternatively, the pistons 74 and the cradles 40 carried thereby may be initially positioned vertically before the workpiece is deposited thereon; and in this respect a height gage, not shown, may be provided for the cradle 40. In this latter case, the cradle will initially be positioned in height as indicated by the gage to accommodate a workpiece of a known diameter.

In the case of the workpiece shown in FIG. 2, its end is provided with a slot 89. Accordingly, a false center 91 is inserted into this slot, the false center having a countersink 93 in its end adapted to receive a lathe center 95, which center is assumed to be that on the chuck 16. Thereafter, the handwheels 66 are rotated in one direction to move the carriages 38 and the workpiece carried thereby into engagement with the center 95 on chuck 16, whereupon the tailstock 14 and/or center 30 are moved toward the other end of the workpiece until the end of the center is inserted into a countersink in said other end of the workpiece. The jaws 18 are now moved radially inwardly to clamp the one end of the workpiece. Usually, the axis of the workpiece 28 is not exactly aligned with the axes of the centers. Assuming that the axis of the workpiece is beneath a center, movement of the center into the countersink at one end of the workpiece will effectively lift that workpiece off of the cradle 40, whereupon a drop in pressure will be indicated by the gage 90. This condition may be corrected by forcing more fluid under pressure into the cylinder 70 to elevate the end of the workpiece and prevent damage to the tailstock or headstock assembly. Similarly, if an end of the workpiece 28 is too high, the center will tend to force it downwardly, and this condition can be observed by a rise in pressure on the gage 90, whereupon pressure will be relieved from the cylinder 70 by valve 85 to lower the end of the workpiece. In this manner, it can be seen that the workpiece can be very accurately positioned (i.e., aligned) with respect to the headstock and tailstock without any damage to the parts of the lathe.

After the workpiece 28 is thus positioned between the headstock and tailstock, the pressure beneath the piston 74 will be relieved, whereupon the cradles 40 will move downwardly to permit unrestricted free rotation of the workpiece. At the completion of a turning operation, the cylinders 70 are again pressurized, whereupon the cradles 40 are elevated into engagement with the opposite ends of the workpiece such that the tailstock 14 and/or center 30 can be moved away from the workpiece, the jaws 18 moved radially outwardly, and the workpiece moved away from the chuck 16 on the carriage 38 by rotation of hand-wheels 66. In this process, the workpiece and the carriages 38 move on the ball bearings 44 which, in turn, rotate on the bedplates 24 and 26. At this point, the workpiece is entirely clear of the tailstock and headstock and may be easily removed from the cradles 40 by means of an overhead crane, and this is accomplished easily and efficiently without damage whatever to the parts of the lathe.

One important advantage of the cradle assembly of FIGS. 2 and 3 is the ability to grind or turn the neck portion 88 of the roll without interference from the cradle and its associated apparatus. The roll journals or necks very often become scoured and/or eccentric due to various operating conditions, thus requiring refurbishing. In FIG. 3, the cutting tool 81 and carriage 83 therefor are shown in outline, the carriage being supported between guideways 24 and 32. It can be seen that the cradle assembly is so designed to permit free passage of the carriage 83 without any interference with the cradle assembly, thus making it possible to cut and/or grind the entire length of the workpiece.

Referring now to FIGS. 4 and 5, another embodiment of the invention is shown wherein parts corresponding to those of FIGS. 2 and 3 are identified by like, primed reference numerals. It will be noted that in the case of FIGS. 2 and 3, the carriage 38 slides on the bedplates 24 and 26 without the benefit of any rotatable bearings, the anti-friction means between the bedplates and carriage 38 simply comprising bearing surfaces 92 and 94 (FIG. 5) on the underside of the carriage. As was the case in FIGS. 2 and 3, the carriage 38 is again provided with a hydraulic cylinder 96 having a piston 98 reciprocable therein, the lower end of the cylinder 96 being connected through conduit 84' to a hand-pump 42'. In this case, however, the cradle 40' is provided with a pair of roller bearings 100 and 102 which engage the underside of the workpiece 28'. A gear rack 62' is again provided on the bed 10' and meshes with a pinion gear 64' connected to a handwheel 66', which handwheel may be replaced by motor means as in the embodiment of FIGS. 2 and 3.

As will be appreciated, the operation of the embodiment of the invention shown in FIGS. 4 and 5 is similar to that of FIGS. 2 and 3 except that in this case the workpiece ordinarily will be shifted back and forth between the headstock and tailstock on the roller bearings 100 and 102 rather than by means of rotation of the handwheels 66'. That is, the handwheels 66' will serve primarily as a means for initially positioning the carriages 38', whereupon longitudinal movement of the workpiece back and forth along the bed 10' can be most readily achieved by guiding it along the roller bearings 100 and 102.

A more or less secondary advantage of the cradle structures 34 and 36 is in centering or recentering cylindrical workpieces (i.e., providing a countersink at the end of the workpiece aligned with its longitudinal centerline). In this procedure the workpiece is initially placed on the cradle structures 34 and 36 and the workpiece raised or lowered to the proper centerline height. Thereafter, the workpiece is advanced on structures 34 and 36 toward the chuck 16 and secured thereto by jaws 18 whereby it may be forcibly rotated. The tailstock center 30 is replaced by a drill or center cutting tool, and the workpiece rotated on the cradles at slow speed while the cutting tool is advanced into its end to provide the desired countersink. After the cutting operation is completed, the cutter or drill is retracted and replaced with the taistock center 30, whereupon the center is advanced into the newly-cut center hole, the cradles lowered, and the workpiece thereafter ground and/or turned in the usual manner.

The present invention thus provides means for loading and unloading a lathe with extremely heavy workpieces whereby the possibility of damage to the lathe is entirely eliminated. Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In the method for processing large heavy rolling mill rolls on metalworking apparatus having a bed, a headstock and a tailstock at opposite ends of the bed, and a pair of spaced elevatable roll-supporting cradles on the bed between the headstock and tailstock and independently reciprocable thereon, the rolls being of varying lengths and shapes and having neck portions of varying diameters at their opposite ends; the steps of separately positioning the respective cradles at spaced locations between the headstock and tailstock to accommodate rolls of a particular length whereby the cradles will be spaced apart in an amount substantially equal to the spacing between the neck portions of said rolls, lowering the neck portions of a roll onto said cradles after the cradles are spaced apart by an amount less than the length of the roll, adjusting the height of said cradles whereby the opposite ends of the roll will be centered with respect to the tailstock and headstock, moving said roll supported on said cradles toward said headstock until one end of the roll engages the headstock, thereafter moving at least a portion of the tailstock into engagement with the other end of said roll, and lowering said cradles to permit the roll to freely rotate between the headstock and tailstock with the weight of the roll being carried on the headstock and tailstock.

2. In the method for processing large heavy rolling mill rolls on a metalworking apparatus having a bed, a headstock and a tailstock at opposite ends of the bed, and a pair of spaced elevatable roll-supporting cradles on the bed between the headstock and tailstock and independently reciprocable thereon, the rolls being of varying lengths and shapes and having neck portions of varying diameters at their opposite ends; the steps of separately positioning the respective cradles at spaced locations between the headstock and tailstock to accommodate rolls of a particular length whereby the cradles will be spaced apart in an amount substantially equal to the spacing between the neck portions of said rolls, lowering the neck portions of a roll onto said cradles after the cradles are spaced apart by an amount less than the length of the roll, independently adjusting the height of said cradles whereby the opposite ends of the roll will be centered with respect to the tailstock and headstock, moving said roll supported on said cradles toward said headstock until one end of the roll engages the headstock, thereafter moving at least a portion of the tailstock into engagement with the other end of said roll, lowering said cradles to permit the roll to freely rotate between the headstock and tailstock with the weight of the roll being carried on the headstock and tailstock, performing a metalworking operation on said roll while it rotates between the headstock and tailstock, independently raising said cradles into engagement with the roll after said metalworking operation whereby the roll will again be supported on the cradles, moving said tailstock away from the roll whereby it is no longer in engagement with the workpiece, moving the roll on said cradle structures away from the headstock, and by means of an overhead crane elevating the roll off said cradle structures.

References Cited in the file of this patent

UNITED STATES PATENTS

| 1,881,147 | Thoma | Oct. 4, 1932 |
| 2,040,028 | Smith et al. | May 5, 1936 |
| 2,067,626 | Benninghoff | Jan. 12, 1937 |
| 2,076,773 | Goyot | Apr. 13, 1937 |
| 2,299,290 | Wood | Oct. 20, 1942 |
| 2,523,563 | Foreman | Sept. 26, 1950 |
| 3,022,690 | Binns | Feb. 27, 1962 |

FOREIGN PATENTS

| 348,568 | Germany | Feb. 10, 1922 |
| 874,978 | Germany | Apr. 27, 1953 |
| 526,827 | France | Mar. 15, 1954 |